United States Patent
Keshner et al.

(10) Patent No.: US 12,246,991 B1
(45) Date of Patent: Mar. 11, 2025

(54) HIGH-EFFICIENCY METHOD FOR CONVERTING LIMESTONE TO SLAKED LIME

(71) Applicants: Marvin S Keshner, Sonora, CA (US); Erik Garth Vaaler, Redwood City, CA (US)

(72) Inventors: Marvin S Keshner, Sonora, CA (US); Erik Garth Vaaler, Redwood City, CA (US)

( * ) Notice: Subject to any disclaimer, the term of this patent is extended or adjusted under 35 U.S.C. 154(b) by 0 days.

(21) Appl. No.: 18/957,760

(22) Filed: Nov. 24, 2024

Related U.S. Application Data

(62) Division of application No. 18/816,956, filed on Aug. 27, 2024.

(51) Int. Cl.
*C04B 2/08* (2006.01)

(52) U.S. Cl.
CPC ................................ *C04B 2/08* (2013.01)

(58) Field of Classification Search
None
See application file for complete search history.

(56) References Cited

U.S. PATENT DOCUMENTS

| | | | | |
|---|---|---|---|---|
| 1,259,241 | A * | 3/1918 | Joachim | E01C 19/1009 366/58 |
| 4,707,350 | A * | 11/1987 | Baudequin | F27B 15/14 34/582 |
| 5,965,103 | A * | 10/1999 | Golley | C04B 2/04 423/640 |
| 2017/0327421 | A1 * | 11/2017 | Heidel | B01D 53/1475 |

FOREIGN PATENT DOCUMENTS

| | | | | |
|---|---|---|---|---|
| WO | WO2002096820 | A1 * | 9/2023 | C04B 2/04 |
| WO | WO-2023165896 | A1 * | 9/2023 | C04B 2/04 |

* cited by examiner

*Primary Examiner* — Michael Forrest
*Assistant Examiner* — Jordan W Taylor
(74) *Attorney, Agent, or Firm* — Shalini Venkatesh

(57) ABSTRACT

A chemical processing method includes decomposing a metal carbonate in a first tube by exposure to a first quantity of heat, producing a metal oxide and carbon dioxide; and hydrating the metal oxide in a second tube concentric with the first, by exposure to steam, producing a metal hydroxide and a second quantity of heat. The partial pressure of the steam and/or of the carbon dioxide is controlled so that the hydration reaction occurs at a second temperature above a first temperature at which the decomposition reaction occurs. The inner one of the concentric tubes has an inner tube wall. At least some of the second quantity of heat flows from the second tube through the inner tube wall to the first tube, providing at least a part of the first quantity of heat.

19 Claims, 2 Drawing Sheets

HIGH-EFFICIENCY METHOD FOR CONVERTING LIMESTONE TO SLAKED LIME

CROSS REFERENCES TO RELATED APPLICATIONS

This application is a division of the following application, U.S. patent application Ser. No. 18/816,956, entitled "High-Efficiency System for Converting Limestone to Slaked Lime", filed on 27 Aug. 2024, which is hereby incorporated by reference, as if set forth in full in this specification.

FIELD OF INVENTION

This invention relates in general to methods for reducing global warming, and more specifically to devices for recycling carbonate materials that can be used to capture carbon dioxide from the air, from the smokestacks of fossil fuel electric generating plants, from cement factories, or from chemical processes that emit carbon dioxide.

BACKGROUND

One of the materials commonly used to capture carbon dioxide is lime. Lime (CaO) and especially slaked lime ($Ca(OH)_2$) react strongly with carbon dioxide ($CO_2$) and become limestone ($CaCO_3$). In turn, limestone can be recycled back to lime and then to slaked lime. The starting material, limestone, is robust, inexpensive, and readily available. Also, it can be recycled hundreds of times. The one disadvantage of using limestone is the large amount of energy required for recycling.

The chemical reaction for capturing carbon dioxide with slaked lime is:

$$Ca(OH)_2 + CO_2 \rightarrow CaCO_3 + H_2O \text{ (liquid)} + \text{heat} (-113 \text{ KJ/mole}) \quad (1)$$

The chemical reaction for recycling limestone back to slaked lime has two stages. First, limestone is decomposed into lime+carbon dioxide. This reaction requires heat. Second, lime reacts with water to form slaked lime. This reaction produces heat.

$$\text{Heat} + CaCO_3 \rightarrow aO + CO_2 \text{ (+178 KJ/mole)} \quad (2)$$

$$CaO + H_2O \text{ (liquid)} \rightarrow Ca(OH)_2 + \text{heat} (-65 \text{ KJ/mole}) \quad (3)$$

Traditional lime kilns, like those used to make Portland Cement, only support reaction (2). Lime, not slaked lime, is the essential ingredient for concrete. Every effort is made to avoid exposing the lime to water or carbon dioxide before it is mixed with water, sand, and gravel to form concrete. Reaction (3) in the wet concrete provides the energy to form the silicates that glue the sand and gravel together.

Capturing carbon dioxide with lime is very energy intensive, with over 80% of the cost per metric ton of $CO_2$ captured being the cost of the energy required to recycle the lime. Many carbon dioxide capture systems only use reaction (2), without the heat recovery possible with reaction (3), resulting in an energy cost of 178 KJ/mole.

Some carbon dioxide capture systems attempt to utilize some of the energy available from reaction (3). At 1 atm pressure, reaction (3) will produce a temperature as high as 500° C. This energy can be used to heat water, create high-pressure steam, and run steam-turbine generators. The overall efficiency of steam generation of electricity is around 38%, similar to that of a coal plant. Hence, 25 KJ/mole is recovered (38% of the available 65 KJ/mole), and the net energy for recycling the lime is reduced from 178 to 153 KJ/mole. However, the additional capital and maintenance costs for this steam-generating system are high.

If the heat from reaction (3) could be captured, the net energy for recycling the lime would be only 113 KJ/mole, almost 40% less than 178 KJ/mole, and the total cost of capturing $CO_2$ could be reduced significantly.

SUMMARY

This invention is a chemical processing system for recycling calcium carbonate, (aka limestone), and other metal carbonates. This system decomposes a metal carbonate, and then hydrates the resulting metal oxide to form a metal hydroxide. The two reactions occur separately, and in different atmospheres, but in a system which provides excellent thermal coupling between them. The hydration process, which generates heat, operates at a temperature above the temperature of the decomposition process, which consumes heat. Thus, the heat of hydration can flow down a thermal gradient and provide a significant fraction of the heat required for the decomposition process.

In this invention, reactions (2) and (3), listed above, are generalized to apply to any metal carbonate, of course, including limestone, $CaCO_3$. The operating temperatures, and the heat required or produced varies for different metal carbonates, but the operating principles of the two-step process apply to all cases.

This system has two concentric tubes. In the first of the two concentric tubes, a metal carbonate is decomposed into a metal oxide and carbon dioxide, in an atmosphere of carbon dioxide. The metal oxide produced in the first concentric tube is then injected into the second of the two concentric tubes, and hydrated in an atmosphere of steam to a hydroxide. The pressures in the two concentric tubes are adjusted so that the heat-producing hydration reaction occurs at a higher temperature than the heat-consuming decomposition reaction. The wall of the inner concentric tube separates the hydration and decomposition processes, and provides excellent thermal coupling between them.

For an embodiment in which $CaCO_3$ is being recycled, if both reactions are to occur at 1 atm partial pressure, the temperature for reaction (2) would have to be in the range of 925-950° C., and the temperature for reaction (3) would be much lower, in the range of 500-525° C. The heat generated by reaction (3), for hydrating lime, cannot flow "uphill" and so cannot supply part of the heat required by reaction (2), for decomposing limestone.

Increasing the partial pressure of the steam in reaction (3) will increase the hydration process temperature. Decreasing the partial pressure of the carbon dioxide in reaction (2) will lower the decomposition process temperature. By doing either one, or a combination of both, the temperature of the heat-producing hydration process can be set to be higher than the temperature required for decomposing the metal carbonate. Then, the heat generated by the hydration process can flow down a temperature gradient, and through the wall of the inner tube, to provide part of the heat required for the decomposition process.

With concentric tubes for the two reaction processes, and with an inner tube wall that has low thermal resistance, the heat produced by the hydration process flows to the decomposition process with only a small temperature difference between the two processes. Thus, by transferring the heat of hydration to the decomposition process, this invention provides a much lower total energy for recycling metal carbonates back to metal hydroxides, and in one embodiment, for recycling limestone back to hydrated or "slaked" lime. With a lower recycling energy required, the total cost for capturing $CO_2$ with slaked lime is significantly reduced.

DETAILED DESCRIPTION

This invention is a chemical processing system with two concentric tubes. The wall of the inner concentric tube bounds an interior cylindrical space, defined for the purposes of this entire disclosure as the inner tube space. The annular space within the outer concentric tube, but external to the inner tube space, which is bounded by the wall of the inner tube and the wall of the outer tube, is defined for the purposes of this disclosure as the outer tube space.

One of the two concentric tube spaces contains an atmosphere of carbon dioxide and hosts the decomposition reaction of one or more metal carbonates, such as: $MgCO_3$, $CaCO_3$, $Na_2CO_3$, $K_2CO_3$, and others, into metal oxides and $CO_2$. The other of the two concentric tube spaces contains an atmosphere of steam and hosts the hydration reaction of the metal oxides produced in the first tube, to create hydroxides, such as: $Mg(OH)_2$, $Ca(OH)_2$, NaOH, KOH, and others.

The use of two concentric tubes provides excellent thermal coupling between the two reactions. The wall of the inner concentric tube separates the inner tube space, in which one reaction occurs, from the outer tube space in which the other reaction occurs and conducts heat from the hydration reaction in one of the two tube spaces to the decomposition reaction in the other tube space. The wall of the inner concentric tube also conducts heat to cool the outgoing metal hydroxide and warm the incoming metal carbonate. Apart from the thermal coupling, the two reactions are isolated from each other. They operate at different pressures, with different atmospheres, and with different reactants.

The tube which has its corresponding tube space hosting the decomposition reaction may for convenience be termed the "first concentric tube", and depending on the embodiment can be either the inner or the outer tube. Accordingly, the other tube, whose corresponding tube space hosts the hydration reaction is termed the "second concentric tube", and would be either the outer or inner tube, respectively. In all cases, heat flows from the tube space within which the hydration process occurs, through the inner tube wall, to the other tube space within which the decomposition process occurs.

Figure 1:
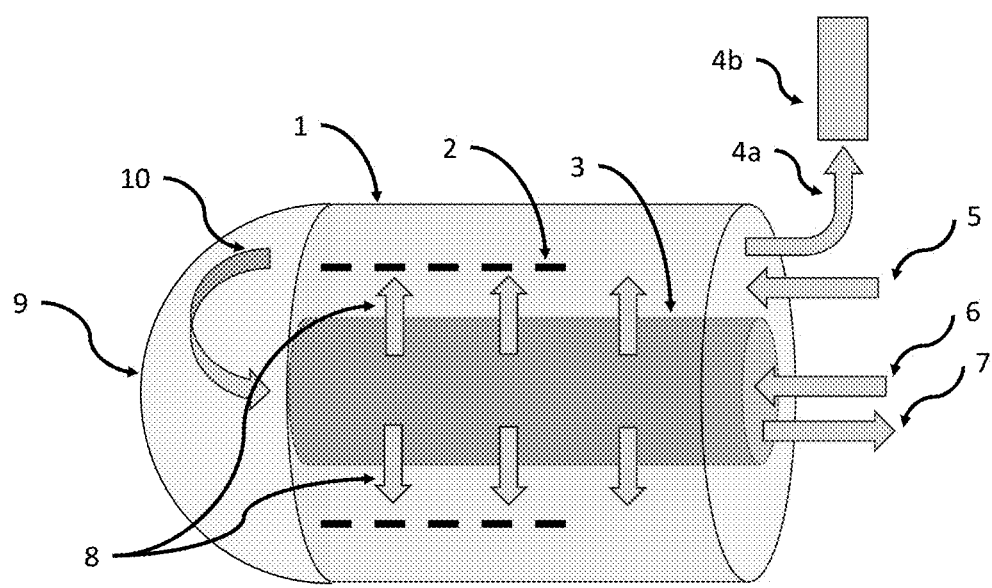
FIG. 1 is an illustration of a chemical processing system according to one embodiment of the present invention, in which the decomposition reaction occurs in an outer tube and the hydration reaction occurs in an inner tube.

FIG. 1 illustrates an embodiment in which decomposition occurs in the outer tube (1) and hydration occurs in the inner tube (3). A metal carbonate (5), such as $CaCO_3$ is input at the right side of outer tube (1), and flows to the left through the outer tube space, the annulus between the inner and outer tube walls. As it flows, heat (8) generated by the hydration reaction in the inner tube (3) flows through the inner tube wall along its entire length to heat the $CaCO_3$ in the outer tube. Additional heat needed to drive the decomposition reaction is added by a heater (2) on the left side. In the particular embodiment shown in FIG. 1, the heater (2) is located inside the outer tube and outside the inner tube, but, in other embodiments, the heater can be located inside the inner tube, or outside the inner and outer tubes.

The carbon dioxide (4a) produced by the decomposition of the carbonate in outer tube (1) flows to the right and is collected at the right side of the outer tube by a gas blower, gas pump, vacuum pump, or gas compressor (4b). The metal oxide (10) produced by that same decomposition reaction exits the outer tube at the left, flows into the end cap (9), is injected into the inner tube on the left, and flows through the lumen of that inner tube to the right. Water (6) is input at the right side of the inner tube, vaporizes within the inner tube, and flows to the left, hydrating the metal oxide it encounters to form a metal hydroxide (7) which finally exits on the right side of the inner tube. The water input is metered to produce the amount of steam required for the hydration reaction. The flows of the metal carbonate in the outer tube and the metal hydroxide in the inner tube are in opposite directions. The left side of each tube is at or above the temperature required for decomposition, while the right side is at room temperature. As the metal hydroxide flows to the right, moving away from the region of the heater, it cools and transfers its heat through the inner tube wall to warm the incoming metal carbonate.

In the embodiment illustrated in FIG. 1, and with $CaCO_3$ as the metal carbonate, the decomposition occurs according to reaction (2), noted above, and reproduced here for convenience:

$$\text{Heat} + CaCO_3 \rightarrow CaO + CO_2 \ (+178 \text{ KJ/mole}) \quad (2)$$

This decomposition reaction is reversible. Its equilibrium temperature is a function of the $CO_2$ partial pressure, as given approximately by the table below. At a temperature above its equilibrium temperature, $CaCO_3$ decomposes to $CaO + CO_2$. At a temperature below its equilibrium temperature, $CaO + CO_2$ will recombine to from $CaCO_3$. Thus, the partial pressure of carbon dioxide in the outer tube sets the temperature at which the $CaCO_3$ will decompose,

| CO2 Partial Pressure (atm) | Equilibrium Temperature ° C. |
|---|---|
| 1 | 898 |
| 0.3419 | 830 |
| 0.0775 | 748 |
| 0.0186 | 680 |
| 0.0030 | 605 |
| 0.0006 | 550 |
| 0.0001 | 500 |

By adjusting the partial pressure of carbon dioxide in the outer tube, the temperature at which $CaCO_3$ (or other metal carbonates in other embodiments) decompose can be controlled. For example, for $CaCO_3$, if the $CO_2$ partial pressure is set at 0.078 atmospheres, then, at temperatures above 748° C., $CaCO_3$ will decompose. At temperatures below 748° C., CaO will recombine with $CO_2$ and form $CaCO_3$.

In an embodiment with $CaCO_3$ as the metal carbonate, water and CaO react in the inner tube to form $Ca(OH)_2$, according to reaction (3), noted above, and reproduced here for convenience:

$$CaO + H_2O \ (\text{liquid}) \rightarrow Ca(OH)_2 + \text{heat} \ (-65 \text{ KJ/mole}) \quad (3)$$

The decomposition reaction consumes heat, and the hydration reaction produces heat.

Some of the hydration heat converts liquid water to steam, and some of the heat (8) flows through the inner tube wall to provide part of the heat required by the decomposition reaction.

This hydration reaction (3), like decomposition reaction (2), is reversible. Its equilibrium temperature versus steam partial pressure is given approximately by the following table:

| Steam Partial Pressure (atm) | Equilibrium Temperature ° C. |
|---|---|
| 118 | 898 |
| 65 | 830 |
| 29 | 748 |
| 13 | 680 |
| 5 | 605 |
| 2 | 550 |
| 1 | 500 |

By setting the partial pressure of the steam, the temperature at which lime, or another metal oxide, in another corresponding embodiment, is hydrated can be controlled. In one embodiment of the type illustrated in FIG. 1, using $CaCO_3$, the steam partial pressure can be set to 120 atm, resulting in an equilibrium temperature for hydrating CaO of approximately 898° C. If the $CO_2$ partial pressure is set to below 1 atm, for example to 0.34 atm, the decomposition reaction will proceed at a temperature above 830° C. This higher temperature of the hydration reaction in the inner tube and the lower temperature of the decomposition reaction in the outer tube will create a temperature gradient. Heat will flow down the temperature gradient from the hydration reaction that produces heat in the inner tube, through the thermally conducting inner tube wall, (experiencing a small temperature drop), into the outer tube, and provide part of the heat to drive the carbonate decomposition reaction.

In another embodiment of the type illustrated in FIG. 1, also using $CaCO_3$, the steam partial pressure may be set to 65 atm, giving a hydration equilibrium temperature of 830° C., and the $CO_2$ partial pressure may be set to 0.078 atm, giving an equilibrium decomposition temperature of 748° C. As before, the temperature of the hydration reaction is above the temperature of the decomposition reaction, and heat flows through the inner wall down the thermal gradient from the hydration reaction to the decomposition reaction. In one embodiment, the drop in temperature through the thermally conducting inner wall is 30° C. The hydration reaction would operate at 804° C., 26° C. below its equilibrium temperature, and the decomposition reaction would operate 774° C., 26° C. above its equilibrium temperature. Both processes would be far enough from their equilibrium temperatures to proceed. In an extreme case, where the temperature drop through the inner tube wall is nearly zero, for both reactions to proceed at a reasonable rate, the partial pressures must be set so that the temperature of the hydration reaction is at least 5° C. below its equilibrium temperature, and the temperature of the of the decomposition reaction is at least 5° C. above its equilibrium temperature.

In other embodiments, by adjusting the carbon dioxide partial pressure to be at or less than 1 atm, over a range from 0.0001 atm to 1 atm, the equilibrium temperature of the decomposition reaction will be in the range from 500° C. to 950° C. This temperature range requires that the steam partial pressure is correspondingly adjusted over a range from 1 atm to 200 atm. The choice of operating pressures is a trade-off. Lower decomposition temperatures require lower partial pressures, and more energy consumed by vacuum pumps to achieve those lower pressures. In some embodiments, the carbon dioxide partial pressure is close to or equal to 1 atm to minimize the energy consumed by vacuum pumps. In other embodiments, the steam pressure is minimized, and the carbon dioxide pressure is set well below 1 atm.

In yet other embodiments, with metal carbonates other than calcium carbonate, the tables of equilibrium temperatures versus pressures of carbon dioxide and steam will be different. The corresponding chemical systems will operate over different pressure and temperature ranges than listed for calcium carbonate in the embodiments discussed above. However, the basic principle is the same. The steam and carbon dioxide pressures are set so that the hydration reaction occurs at a temperature higher than the decomposition reaction, causing heat to flow from the hydration reaction, down a thermal gradient, through the inner tube wall, and provide some of the heat required for the decomposition reaction.

Figure 2:
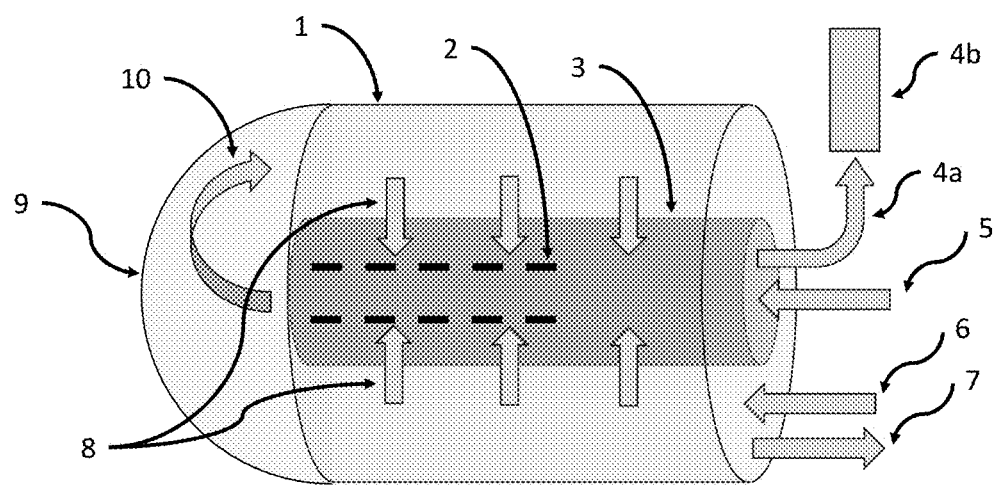
FIG. 2 is an illustration of a chemical processing system according to another embodiment of the present invention, in which the locations of the chemical reactions in the inner and outer tubes are reversed. The decomposition reaction occurs in the inner tube and the hydration reaction occurs in the outer tube.

FIG. 2 illustrates an embodiment in which the decomposition occurs in the inner tube (3) and hydration occurs in the outer tube (1), a reversal of the arrangement shown in FIG. 1. Heat (8) still flows from the hydration reaction through the inner tube wall to the decomposition reaction, and from the outgoing metal hydroxide to the incoming metal carbonate. In the particular embodiment shown, the heater (2) is placed inside the inner tube, but, in other embodiments, it can be located outside the inner tube and inside the annulus between the walls of the inner and outer tubes, or outside of the outer tube. A metal carbonate (5), such as $CaCO_3$, is introduced into the inner tube and flows to the left. $CO_2$ (4a) produced during the decomposition of the carbonate flows from the hot region on the far left, and out of the inner tube at the far right, where it is collected by a gas blower, gas pump, vacuum pump, or compressor (4b). On the left, after decomposition, CaO (10) or, in embodiments where another metal carbonate is involved, its corresponding metal oxide, flows out of the inner tube, flows into the end cap (9), and is injected into the outer tube. In the outer tube (1), the CaO or other metal oxide combines with steam to form a corresponding hydroxide+heat. The hydroxide (7) flows from left to right and exits on the far right from the outer tube. Water (6), needed to create the steam, is injected into the outer tube at the far right.

In one embodiment, the metal carbonate and the metal hydroxide are both granular, with a texture like sand. They can be moved through the tubes by any of a number of methods. In one embodiment, they are moved by Archimedes Screws. In one embodiment, the Archimedes Screws are oriented in opposite directions and both concentric tubes are rotated together in the same direction. The oppositely-directed Archimedes Screws will move the carbonate to the left and the hydroxide to the right. In another embodiment, without Archimedes Screws, the tubes are rotated to constantly mix the reactants, and to facilitate the transfer of heat from the tube walls to and from the reactants.

From the discussion above, for embodiments that use calcium carbonate, one tube has an atmosphere of steam at a partial pressure in the range of 1 to 200 atm, and the other tube has an atmosphere of carbon dioxide at a partial pressure in the range 0.0001 to 1 atm. Valves (not shown) withstand the pressure differences, and move material into and out of each tube. Possible valve types include spool valves and others. The end cap (9) has a carbon dioxide atmosphere at a pressure at or below 1 atm. At the left side of the tube in which the hydration reaction occurs a valve is required to separate the carbon dioxide atmosphere of the decomposition reaction from the steam atmosphere of the hydration reaction, and to inject the metal oxide to be hydrated. At the right side, each of the tubes requires a valve and/or a rotary seal to separate its internal atmosphere from external air at 1 atm, and to input metal carbonates and output metal hydroxides.

The materials from which the tubes are constructed must meet significant demands for high mechanical strength and good thermal conductivity at elevated temperatures. For operation in the 750° C. to 950° C. region, the combined temperatures and pressures are too high for many materials. Also, the inner tube wall, must be thin enough to adequately conduct heat and minimize the temperature drop across the wall, which should be less than 50° C. With either Schedule 40 or Schedule 80 dimensions, the tensile or compressive stress in the inner wall is 6.7 to 27 times the pressure inside the tube. The choice of materials for constructing the two concentric tubes and the end caps, includes: metal alloys, including: stainless steel alloys, nickel alloys, tungsten alloys, chrome alloys, molybdenum alloys, titanium alloys, zirconium alloys, and others; and various ceramics, including: SiC, SiN, alumina, and others.

The materials from which the tubes are constructed must also be highly corrosion resistant in an environment of high temperature steam and highly alkaline reactants. And, they must be resistant to abrasion from the flow of particles of metal carbonates, metal oxides, and metal hydroxides. Therefore, the tube walls must be constructed from a highly corrosion resistant and abrasion resistant material, or from another material that is coated with a highly corrosion resistant and abrasion resistant material. The choice of corrosion and abrasion resistant materials for constructing the two concentric tubes and the end caps includes: nickel alloys, chrome alloys, alumina ceramics, and others. The choice of corrosion and abrasion resistant coating materials for coating the tubes, when the tubes are constructed with other materials, such as SiC, molybdenum, or molybdenum alloys, includes: nickel, chrome, nickel-chrome alloys, refractory metals, alumina, Mo—Si—B, and others.

The atmosphere in the first concentric tube, which hosts the deposition process, is almost pure carbon dioxide that can subsequently be collected and sequestered. However, one can add, or allow a small amount of water vapor to be present, in the range of 0.1% to 10% by volume. Water vapor will catalyze the decomposition, and increase the rate at which the metal carbonates decompose. Too high a concentration of water vapor will burden the compressors or blowers that are exhausting the carbon dioxide and creating a carbon dioxide partial pressure at or below 1 atm. In one embodiment, water vapor is added to the carbon dioxide atmosphere. In another embodiment, some drying of the incoming carbonate may be desirable.

In some embodiments, the carbon dioxide produced is collected, compressed, and sequestered, and the compression heat is used to heat and/or dry the incoming carbonate, and/or used to heat the water used for hydrating the metal oxide and, thereby, further lower the total energy required for recycling the metal carbonate.

The invention claimed is:

1. A chemical processing method comprising;
providing a metal carbonate to a first tube, and water to a second tube concentric with the first tube;
exposing the metal carbonate to a first quantity of heat in the first tube, such that a decomposition reaction occurs at a first temperature, decomposing the metal carbonate to provide a first output of carbon dioxide and a second output of a metal oxide;
transferring the metal oxide output from the first tube into a second tube, concentric with the first tube; and
exposing the transferred metal oxide to steam generated by the water in the second tube, such that a hydration reaction occurs at a second temperature, hydrating the transferred metal oxide to produce a metal hydroxide as a second process output and a second quantity of heat;
wherein at least one of a steam partial pressure characterizing the steam and a carbon dioxide partial pressure characterizing the carbon dioxide is controlled, so that the second temperature at which the hydration reaction occurs is greater that the first temperature at which the decomposition reaction occurs;
wherein one of the first and second concentric tubes is an inner tube having an inner tube wall, the inner tube being housed within the other of the first and second concentric tubes, and the other of the first and second concentric tubes is an outer tube; and
wherein at least some of the second quantity of heat flows from the second tube through the inner tube wall to the first tube, to provide at least a part of the first quantity of heat used in the decomposition reaction.

2. The method of claim 1,
wherein transferring the metal oxide comprises capturing the metal oxide at an end cap of the outer tube and injecting the captured metal oxide into the second tube.

3. The method of claim 1,
wherein the metal carbonate is calcium carbonate; and
wherein the steam partial pressure in the second tube is maintained at 1 atm or greater.

4. The method of claim 1,
wherein the metal carbonate is calcium carbonate; and
wherein the carbon dioxide partial pressure in the first tube is maintained at 1 atm or less.

5. The method of claim 1,
wherein the metal carbonate is calcium carbonate, and the first temperature in the first tube is in the range 500° C. to 950° C.

6. The method of claim 1,
wherein the first tube, in which the decomposition reaction occurs, is the inner tube.

7. The method of claim 1,
wherein the first tube, in which the decomposition reaction occurs, is the outer tube.

8. The method of claim 1,
further comprising rotating both concentric tubes.

9. The method of claim 1, wherein the metal carbonate is a granular material.

10. The method of claim 1,
wherein, in the first tube, the metal carbonate is moved in a first axial direction and the carbon dioxide flows in a second axial direction opposite to the first axial direction, and
wherein, in the second tube, the metal oxide is moved in the second axial direction and the steam and water producing the steam flow in the first axial direction.

11. The method of claim 1,
wherein the first and second concentric tubes and end cap comprise a metal alloy or a ceramic.

12. The method of claim 11,
wherein the metal alloy is an alloy selected from a group consisting of stainless steel alloys, nickel alloys, tungsten alloys, chrome alloys, molybdenum alloys, tungsten alloys, titanium alloys, and zirconium alloys.

13. The method of claim 11, wherein the ceramic is selected from a group consisting of SiC, SiN, and alumina.

14. The method of claim 1, wherein the first and second concentric tubes and end cap are constructed from a corrosion resistant and abrasion resistant material.

15. The method of claim 14, wherein the corrosion resistant and abrasion resistant material comprises either a metal alloy or a ceramic.

16. The method of claim 1, wherein the first and second concentric tubes and end cap are constructed from a material coated with a corrosion resistant and abrasive resistant coating.

17. The method of claim 16, wherein the corrosion resistant and abrasion resistant coating is chosen from a group consisting of nickel, chrome, a nickel-chrome alloy, a refractory metal, alumina, and Mo—Si—B.

18. The method of claim 1, wherein waste heat from an external process is used to pre-heat the metal carbonate provided to the first tube water and/or to pre-heat the water provided to the second tube.

19. The method of claim 1, wherein water vapor at a concentration in the range 0.1% to 10% by volume is present in the first tube to catalyze the decomposition reaction.

* * * * *